United States Patent
Feng et al.

(10) Patent No.: US 12,430,571 B2
(45) Date of Patent: Sep. 30, 2025

(54) DATA FUSION METHOD AND APPARATUS, AND DEVICE AND STORAGE MEDIUM

(71) Applicant: CHINA UNIONPAY CO., LTD., Shanghai (CN)

(72) Inventors: Guanjun Feng, Shanghai (CN); Jing Li, Shanghai (CN); Yutian Wen, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 19/104,587

(22) PCT Filed: Dec. 7, 2022

(86) PCT No.: PCT/CN2022/137357
§ 371 (c)(1),
(2) Date: Feb. 18, 2025

(87) PCT Pub. No.: WO2024/036829
PCT Pub. Date: Feb. 22, 2024

(65) Prior Publication Data
US 2025/0259079 A1    Aug. 14, 2025

(30) Foreign Application Priority Data
Aug. 19, 2022  (CN) .......................... 202210996533.4

(51) Int. Cl.
*G06N 5/022* (2023.01)
(52) U.S. Cl.
CPC .................................. *G06N 5/022* (2013.01)
(58) Field of Classification Search
CPC ...................................................... G06N 5/022
See application file for complete search history.

(56) References Cited

U.S. PATENT DOCUMENTS

| 11,470,400 B2* | 10/2022 | Heller | ................. G06Q 30/0272 |
| 2018/0227385 A1* | 8/2018 | Showalter | ............. H04L 45/306 |

FOREIGN PATENT DOCUMENTS

| CN | 103391311 A | 11/2013 |
| CN | 103605703 A | 2/2014 |
| CN | 113837878 A | 12/2021 |
| CN | 115438723 A | 12/2022 |
| WO | WO-2020/259598 A1 | 12/2020 |
| WO | WO-2021/233049 A1 | 11/2021 |

OTHER PUBLICATIONS

International Search Report and Written Opinion for PCT Appl. No. PCT/CN2022/137357 mailed Mar. 21, 2023 (8 pages).

* cited by examiner

*Primary Examiner* — Etienne P Leroux
(74) *Attorney, Agent, or Firm* — Foley & Lardner LLP

(57) ABSTRACT

A data fusion method and apparatus, and a device and a storage medium are provided. The method includes: acquiring, from a first data center, a plurality of pieces of first data to be compared that are within a preset time period, and acquiring, from a second data center, a plurality of pieces of second data to be compared that are within the preset time period; then, determining the same data unique identifier in the plurality of pieces of first data to be compared and the plurality of pieces of second data to be compared, and taking the same data unique identifier as a first data identifier; and acquiring first data to be compared that corresponds to the first data identifier, and acquiring second data to be compared that corresponds to the first data identifier.

13 Claims, 7 Drawing Sheets

DATA FUSION METHOD AND APPARATUS, AND DEVICE AND STORAGE MEDIUM

CROSS REFERENCE TO RELATED APPLICATIONS

This application is a national phase entry under 35 U.S.C § 371 of International Application No. PCT/CN2022/137357, filed on Dec. 7, 2022, which claims priority to Chinese Patent Application No. 202210996533.4, filed with the China National Intellectual Property Administration on Aug. 19, 2022 and entitled "DATA FUSION METHOD AND APPARATUS, AND DEVICE AND STORAGE MEDIUM", which is hereby incorporated by reference in its entirety.

TECHNICAL FIELD

The embodiments of the present disclosure relate to the field of data processing technology, and in particular, to a data fusion method and apparatus, and device and storage medium.

BACKGROUND

With the rapid development of Internet technology, the scale of business systems is getting larger and larger, and the losses caused by each technical failure are also immeasurable. In order to improve the disaster recovery capability of business systems, current business systems generally adopt a remote multi-active architecture, that is, data centers are set up in different geographical locations, and different data centers can provide external business services. Data stored in different data centers back up each other. Since different data centers have synchronization delays when backing up data, the data stored in different data centers are not completely consistent at any point in time.

For a certain business service, data center A is set to provide the business service to the outside. When data center A has an equipment failure, it will often switch to other data centers, and the other data centers will continue to provide the business service. However, due to the synchronization delay between different data centers, the data corresponding to the business service may not exist in other data centers, or the data in other data centers is inconsistent with the data in data center A, which will cause the data in other data centers to be inconsistent. There is an error in providing this business service.

At present, a preset duration including the switching time point is generally determined, and the data within the preset duration is obtained from data center A as the source data. The source data is copied to other data centers. When the source data is inconsistent with the data of other data centers, it will be judged based on the update time of the data, and the data corresponding to the later update time will be selected for update. This method will cause problems such as data omissions, and cannot guarantee the data integrity and continuity of the data center.

SUMMARY

Embodiments of the present disclosure provide a data fusion method and apparatus, and device and storage medium, which are used to guarantee the data integrity and continuity of the data center.

In one aspect, embodiments of the present disclosure provide a data fusion method, including:

obtaining a plurality of first data to be compared within a preset duration from a first data center, and obtaining a plurality of second data to be compared within the preset duration from a second data center; wherein the preset duration is determined based on a switching time point of a data center;

determining a same data unique identifier among the plurality of first data to be compared and the plurality of second data to be compared, as a first data identifier;

for any first data identifier, obtaining a first datum to be compared corresponding to the first data identifier from the plurality of first data to be compared as a first target datum, and obtaining a second datum to be compared corresponding to the first data identifier from the plurality of second data to be compared as a second target datum;

updating the second target datum based on a first transaction status of the first target datum and a second transaction status of the second target datum.

Optionally, the updating the second target datum based on the first transaction status of the first target datum and the second transaction status of the second target datum, includes:

in response to the first transaction status of the first target datum being not empty, the second transaction status of the second target datum being not empty, and the first transaction status being different from the second transaction status, respectively determining a first status position corresponding to the first transaction status and a second status position corresponding to the second transaction status based on a preset transaction status machine;

in response to the first status position being located after the second status position, updating the second target datum by using the first target datum.

Optionally, the method further includes:

in response to the first transaction status being the same as the second transaction status, judging a transaction time point of the first target datum and a transaction time point of the second target datum;

in response to the transaction time point of the first target datum being later than the transaction time point of the second target datum, updating the second target datum by using the first target datum.

Optionally, the updating the second target datum based on the first transaction status of the first target datum and the second transaction status of the second target datum, includes:

in response to the first transaction status of the first target datum being empty and the second transaction status of the second target datum being empty, respectively determining M number of first subsequent transaction data corresponding to the first target datum and N number of second subsequent transaction data corresponding to the second target datum; wherein M>=0, N>=0;

respectively determining a data unique identifier corresponding to each of the M number of first subsequent transaction data as a first subsequent identifier, and determining a data unique identifier corresponding to each of the N number of second subsequent transaction data as a second subsequent identifier;

based on a preset transaction status machine, respectively determining a first subsequent status position corresponding to each of the M number of first subsequent transaction data and determining a second subsequent status position corresponding to each of the N number of second subsequent transaction data;

based on the obtained M number of first subsequent identifiers and N number of second subsequent identifiers, as well as the M number of first subsequent status positions and N number of second subsequent status positions, determining a target subsequent transaction data chain;

updating the second transaction status of the second target datum based on the target subsequent transaction data chain.

Optionally, the based on the obtained M number of first subsequent identifiers and N number of second subsequent identifiers, as well as the M number of first subsequent status positions and N number of second subsequent status positions, determining the target subsequent transaction data chain, includes:

in response to a same subsequent identifier not existing among the M number of first subsequent identifiers and the N number of second subsequent identifiers, determining a first subsequent transaction datum corresponding to each of the M number of first subsequent status positions, and a second subsequent transaction datum corresponding to each of the N number of second subsequent status positions as a target subsequent transaction datum;

sorting the target subsequent transaction datum according to transaction time points to obtain the target subsequent transaction data chain.

Optionally, the method further includes:

in response to the same subsequent identifier existing among the M number of first subsequent identifiers and the N number of second subsequent identifiers, grouping the first subsequent identifiers and the second subsequent identifiers with the same subsequent identifier into one group to obtain at least one identifier matching group; determining the first subsequent identifiers in the identifier matching group as a first matching identifier, and determining the second subsequent identifiers in the identifier matching group as a second matching identifier;

for any identifier matching group, determining a first subsequent status position corresponding to the first matching identifier and a second subsequent status position corresponding to the second matching identifier; deleting a subsequent transaction datum corresponding to a later status position in the first subsequent status position and the second subsequent status position;

determining a first subsequent transaction datum corresponding to each of remaining P number of first subsequent status positions and a second subsequent transaction datum corresponding to each of remaining Q number of second subsequent status positions as a target subsequent transaction datum; wherein $0<=P<=M$, $0<=Q<=N$;

sorting the target subsequent transaction datum according to transaction time points to obtain the target subsequent transaction data chain.

Optionally, the updating the second transaction status of the second target datum based on the target subsequent transaction data chain, includes:

for any two adjacent target subsequent transaction data in the target subsequent transaction data chain, determining a first position relationship corresponding to the two adjacent target subsequent transaction data based on the preset transaction status machine;

determining a second position relationship of the two adjacent target subsequent transaction data in the target subsequent transaction data chain;

in response to the first position relationship being the same as the second position relationship, determining the second transaction status of the second target datum based on a transaction status corresponding to each target subsequent transaction data in the target subsequent transaction data chain.

Optionally, the data unique identifier includes an application service unique identifier and a center service unique identifier; and the method further includes:

determining at least one pair of data to be compared with different application service unique identifiers and the same center service unique identifier from the plurality of first data to be compared and the plurality of second data to be compared; wherein the pair of data to be compared includes a first datum to be compared and a second datum to be compared;

for the at least one pair of data to be compared, in response to a transaction time point of the first datum to be compared in the pair of data to be compared is earlier than a transaction time point of the second datum to be compared in the pair of data to be compared, updating the second datum to be compared in the pair of data to be compared by using the first datum to be compared in the pair of data to be compared.

Optionally, after updating the second target datum based on the first transaction status of the first target datum and the second transaction status of the second target datum, the method further includes:

for a first attribute identifier in the second target datum, determining whether a first attribute value corresponding to the first attribute identifier is within a preset range, and in response to the first attribute value corresponding to the first attribute identifier being not within the preset range, adding the second target datum to an exception file;

for the first attribute identifier in the second target datum, determining a second attribute identifier associated with the first attribute identifier, and determining whether the first attribute value corresponding to the first attribute identifier and a second attribute value corresponding to the second attribute identifier satisfy a preset relationship, in response to the preset relationship being satisfied, adding the second target datum to the exception file; wherein the exception file is used for manual review.

In one aspect, embodiments of the present disclosure provide a data fusion device, including:

an obtaining module, configured to obtain a plurality of first data to be compared within a preset duration from a first data center, and to obtain a plurality of second data to be compared within the preset duration from a second data center; wherein the preset duration is determined based on a switching time point of a data center;

a determination module, configured to determine a same data unique identifier among the plurality of first data to be compared and the plurality of second data to be compared, as a first data identifier;

an update module, configured to obtain, for any first data identifier, a first datum to be compared corresponding to the first data identifier from the plurality of first data to be compared as a first target datum, and obtain a second datum to be compared corresponding to the first data identifier from the plurality of second data to be compared as a second target datum; and update the second target datum based on a first transaction status of the first target datum and a second transaction status of the second target datum.

Optionally, the update module is further configured for:

in response to the first transaction status of the first target datum being not empty, the second transaction status of the second target datum being not empty, and the first transaction status being different from the second transaction status, respectively determining a first status position corresponding to the first transaction status and a second status position corresponding to the second transaction status based on a preset transaction status machine;

in response to the first status position being located after the second status position, updating the second target datum by using the first target datum.

Optionally, the update module is further configured for:

in response to the first transaction status being the same as the second transaction status, judging a transaction time point of the first target datum and a transaction time point of the second target datum;

in response to the transaction time point of the first target datum being later than the transaction time point of the second target datum, updating the second target datum by using the first target datum.

Optionally, the update module is further configured for:

in response to the first transaction status of the first target datum being empty and the second transaction status of the second target datum being empty, respectively determining M number of first subsequent transaction data corresponding to the first target datum and N number of second subsequent transaction data corresponding to the second target datum; wherein M>=0, N>=0;

respectively determining a data unique identifier corresponding to each of the M number of first subsequent transaction data as a first subsequent identifier, and determining a data unique identifier corresponding to each of the N number of second subsequent transaction data as a second subsequent identifier;

based on a preset transaction status machine, respectively determining a first subsequent status position corresponding to each of the M number of first subsequent transaction data and determining a second subsequent status position corresponding to each of the N number of second subsequent transaction data;

based on the obtained M number of first subsequent identifiers and N number of second subsequent identifiers, as well as the M number of first subsequent status positions and N number of second subsequent status positions, determining a target subsequent transaction data chain;

updating the second transaction status of the second target datum based on the target subsequent transaction data chain.

Optionally, the update module is further configured for:

in response to a same subsequent identifier not existing among the M number of first subsequent identifiers and the N number of second subsequent identifiers, determining a first subsequent transaction datum corresponding to each of the M number of first subsequent status positions, and a second subsequent transaction datum corresponding to each of the N number of second subsequent status positions as a target subsequent transaction datum;

sorting the target subsequent transaction datum according to transaction time points to obtain the target subsequent transaction data chain.

Optionally, the update module is further configured for:

in response to the same subsequent identifier existing among the M number of first subsequent identifiers and the N number of second subsequent identifiers, grouping the first subsequent identifiers and the second subsequent identifiers with the same subsequent identifier into one group to obtain at least one identifier matching group; determining the first subsequent identifiers in the identifier matching group as a first matching identifier, and determining the second subsequent identifiers in the identifier matching group as a second matching identifier;

for any identifier matching group, determining a first subsequent status position corresponding to the first matching identifier and a second subsequent status position corresponding to the second matching identifier; deleting a subsequent transaction datum corresponding to a later status position in the first subsequent status position and the second subsequent status position;

determining a first subsequent transaction datum corresponding to each of remaining P number of first subsequent status positions and a second subsequent transaction datum corresponding to each of remaining Q number of second subsequent status positions as a target subsequent transaction datum; wherein $0<=P<=M$, $0<=Q<=N$;

sorting the target subsequent transaction datum according to transaction time points to obtain the target subsequent transaction data chain.

Optionally, the update module is further configured for:

for any two adjacent target subsequent transaction data in the target subsequent transaction data chain, determining a first position relationship corresponding to the two adjacent target subsequent transaction data based on the preset transaction status machine;

determining a second position relationship of the two adjacent target subsequent transaction data in the target subsequent transaction data chain;

in response to the first position relationship being the same as the second position relationship, determining the second transaction status of the second target datum based on a transaction status corresponding to each target subsequent transaction data in the target subsequent transaction data chain.

Optionally, the data unique identifier includes an application service unique identifier and a center service unique identifier; and the update module is further configured for:

determining at least one pair of data to be compared with different application service unique identifiers and the same center service unique identifier from the plurality of first data to be compared and the plurality of second data to be compared; wherein the pair of data to be compared includes a first datum to be compared and a second datum to be compared;

for the at least one pair of data to be compared, in response to a transaction time point of the first datum to be compared in the pair of data to be compared is earlier than a transaction time point of the second datum to be compared in the pair of data to be compared, updating the second datum to be compared in the pair of data to be compared by using the first datum to be compared in the pair of data to be compared.

Optionally, the device further includes a verification module configured for:
- for a first attribute identifier in the second target datum, determining whether a first attribute value corresponding to the first attribute identifier is within a preset range, and in response to the first attribute value corresponding to the first attribute identifier being not within the preset range, adding the second target datum to an exception file;
- for the first attribute identifier in the second target datum, determining a second attribute identifier associated with the first attribute identifier, and determining whether the first attribute value corresponding to the first attribute identifier and a second attribute value corresponding to the second attribute identifier satisfy a preset relationship, in response to the preset relationship being satisfied, adding the second target datum the exception file; wherein the exception file is used for manual review.

In one aspect, embodiments of the present disclosure provide a computer device, including a memory, a processor and a computer program stored in the memory and executable on the processor, wherein the processor executes the computer program to implement steps of the above data fusion method.

In one aspect, embodiments of the present disclosure provide a computer-readable storage medium, storing a computer program executed by a computer device, wherein the computer program is run on the computer device to cause the computer device to execute steps of the above data fusion method.

In one aspect, embodiments of the present disclosure provide a computer program product, including a computer program stored in a computer-readable storage medium, and the computer program including program instructions, wherein the program instructions are executed by a computer device to cause the computer device to perform steps of the above data fusion method.

In the embodiments of the present disclosure, a plurality of first data to be compared within a preset duration are obtained from a first data center, and a plurality of second data to be compared within the preset duration are obtained from a second data center, and then the same data unique identifier among the plurality of first data to be compared and the plurality of second data to be compared is determined and used as a first data identifier. For any first data identifier, the first datum to be compared corresponding to the first data identifier is obtained from the plurality of first data to be compared as a first target datum, and a second datum to be compared corresponding to the first data identifier is obtained from the plurality of second data to be compared as a second target datum; and the second target datum is updated based on a first transaction status of the first target datum and a second transaction status of the second target datum. Since the judgment in the present disclosure is not simply based on the update time of the first target datum and the update time of the second target datum, but based on the first transaction status of the first target datum and the second transaction status of the second target datum to update the second target datum, the sequence relationship of each transaction status in the transaction scenario is fully considered, making the updated second target datum more accurate and ensuring the data integrity and continuity of the second data center.

BRIEF DESCRIPTION OF FIGURES

In order to more clearly illustrate the technical solutions in the embodiments of the present disclosure, the following will briefly introduce the drawings needed to describe the embodiments. Obviously, the drawings in the following description are only some embodiments of the present disclosure. Those of ordinary skill in the art can also obtain other drawings based on these drawings without exerting any creative effort.

DETAILED DESCRIPTION

In order to make the purpose, technical solutions and beneficial effects of the present disclosure more clear, the present disclosure will be further described in detail below with reference to the accompanying drawings and embodiments. It should be understood that the specific embodiments described here are only used to explain the present disclosure and are not intended to limit the present disclosure.

Figure 1:
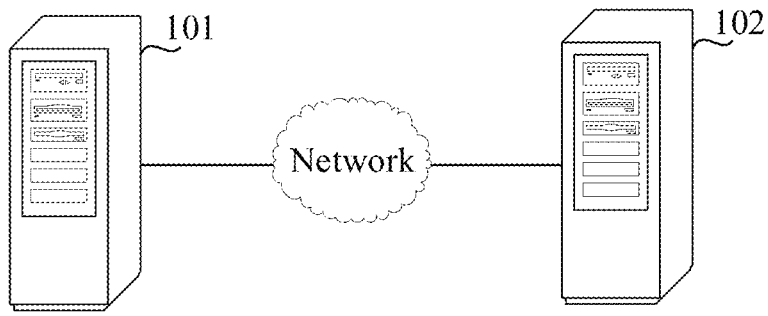
FIG. 1 is a schematic diagram of a system architecture provided by embodiments of the present disclosure.

Referring to FIG. 1, which is an architecture diagram of a data fusion system applicable to the embodiments of the present disclosure. The architecture diagram of the data fusion system includes at least a first data center 101 and a second data center 102.

The first data center 101 can be an independent physical server, or a server cluster or distributed system composed of multiple physical servers, or a cloud server that can provide basic cloud computing services, such as cloud services, cloud databases, cloud computing, cloud functions, cloud storage, network services, cloud communications, middleware services, domain name services, security services, content delivery network (CDN), and big data and artificial intelligence platforms, etc.

The second data center 102 can be an independent physical server, or a server cluster or distributed system composed of multiple physical servers, or a cloud server that can provide basic cloud computing services, such as cloud services, cloud databases, cloud computing, cloud functions, cloud storage, network services, cloud communications, middleware services, domain name services, security services, content delivery network (CDN), and big data and artificial intelligence platforms, etc.

The first data center 101 and the second data center 102 can be directly connected through wired or wireless manners, or the connection can be established through an intermediate server.

The first data center 101 provides external business services. When an equipment failure occurs in the first data center 101, it is switched to the second data center 102, and the second data center 102 continues to provide external business services. When a data center switch occurs, a data fusion system 104 in the second data center 102 obtains a plurality of first data to be compared within a preset duration from the first data center, and obtains a plurality of second data to be compared within the preset duration from the second data center, where the preset duration is determined based on a switching time point of a data center; determines a same data unique identifier among the plurality of first data to be compared and the plurality of second data to be compared as a first data identifier; for any first data identifier, obtain a first datum to be compared corresponding to the first data identifier from the plurality of first data to be compared as a first target datum, and obtain a second datum to be compared corresponding to the first data identifier from the plurality of second data to be compared as a second target datum; update the second target datum based on a first transaction status of the first target datum and a second transaction status of the second target datum to obtain the updated second data.

Figure 2:
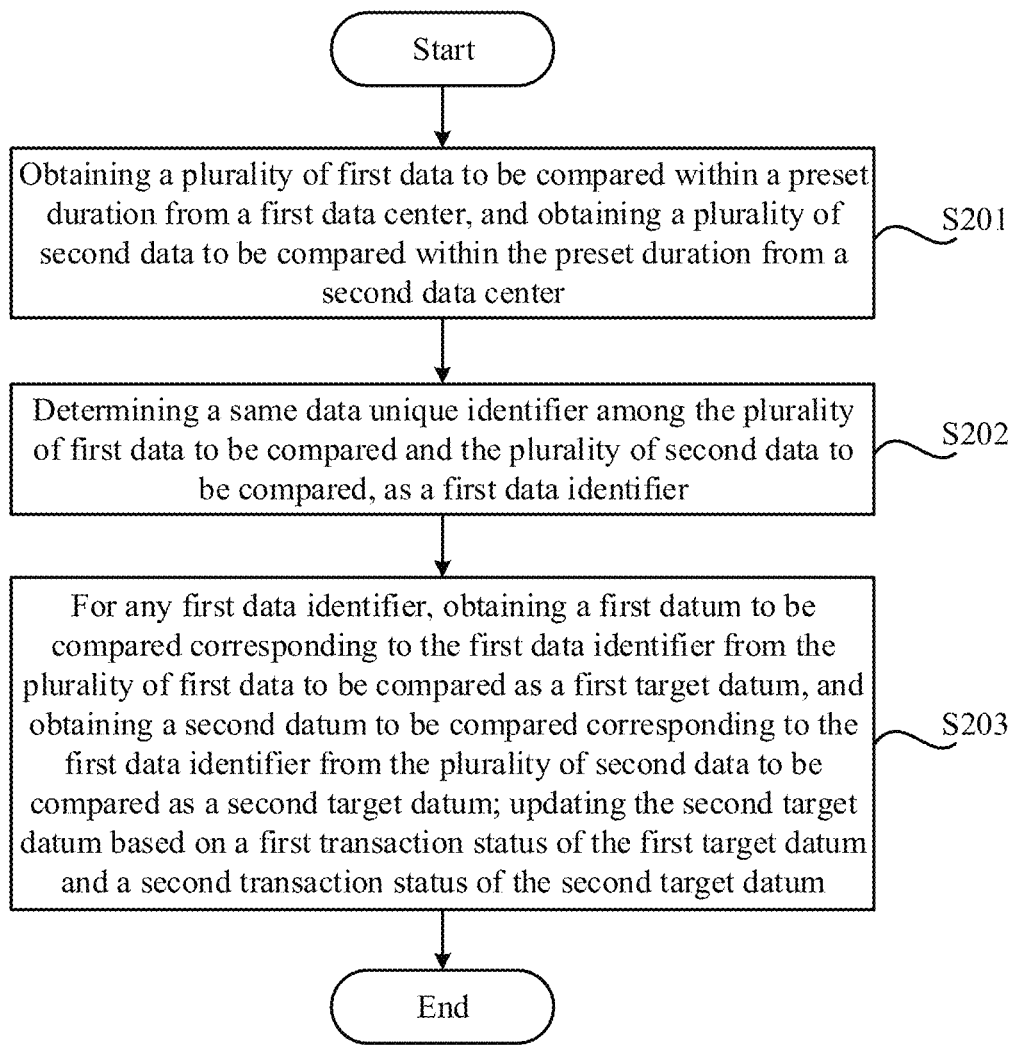
FIG. 2 is a schematic flow chart of a data fusion method provided by embodiments of the present disclosure.

Based on the system architecture diagram shown in FIG. 1, the embodiments of the present disclosure provide a process of a data fusion method. As shown in FIG. 2, the process of the method is executed by the data fusion system in the second data center 102 shown in FIG. 1, and the method includes the following steps.

Step S201: obtaining a plurality of first data to be compared within a preset duration from a first data center, and obtaining a plurality of second data to be compared within the preset duration from a second data center.

Specifically, the preset duration is determined based on the switching time point of the data center. A preset duration can be a synchronization delay of a data center, or a sum of a synchronization delay and a specified delay.

A starting point of the preset duration is the switching time point of the data center minus the preset duration, and an end point of the preset duration is the switching time point of the data center plus the preset duration.

Step S202: determining a same data unique identifier among the plurality of first data to be compared and the plurality of second data to be compared, as a first data identifier.

Specifically, the data unique identifier includes an application service unique identifier and a center service unique identifier. Here, the application service unique identifier is determined by the business service and sent to the data center, and does not differ for different data centers; the center service unique identifier is determined by the data center, and can be different due to different data centers.

In the present disclosure, the same data unique identifier means that the application service unique identifier is the same, and the center service unique identifier is the same.

The first datum to be compared can be basic transaction data or subsequent transaction data. For example, in the consumption scenario, it includes consumption-return operation steps, where the data generated by the consumption operation is the basic transaction data, and the data generated by the return operation is the subsequent transaction datum.

When the first datum to be compared is the basic transaction data, the first datum to be compared includes multiple attribute identifiers, which are an application service unique identifier, a center service unique identifier, a transaction time point, a transaction type, a transaction status, a transaction amount, a payment amount and an accumulated returned amount.

When the first datum to be compared is the subsequent transaction datum, the first datum to be compared includes multiple attribute identifiers, which are an application service unique identifier, a center service unique identifier, a transaction time point, a transaction type, a transaction status, a transaction amount, a payment amount and an accumulated returned amount, and also includes an application service unique identifier of an associated basic transaction data.

The second datum to be compared is similar to the first datum to be compared, and will not be described in detail here.

Step S203: for any first data identifier, obtaining a first datum to be compared corresponding to the first data identifier from the plurality of first data to be compared as a first target datum, and obtaining a second datum to be compared corresponding to the first data identifier from the plurality of second data to be compared as a second target datum; updating the second target datum based on a first transaction status of the first target datum and a second transaction status of the second target datum.

Specifically, the transaction status in the first target datum is regarded as the first transaction status, and the transaction status in the second target datum is regarded as the second transaction status.

In the same transaction scenario, the transaction status can be different states. For example, in the consumption scenario, the transaction status can be order success, payment success, order failure, payment failure, etc.

If the first transaction status is not empty and the second transaction status is not empty, a transaction sequence relationship between the first transaction status and the second transaction status is determined, and based on the transaction sequence relationship, the second target datum is updated to obtain the updated second data.

If the first transaction status is empty and the second transaction status is empty, M number of first subsequent transaction data corresponding to the first target datum and N number of second subsequent transaction data corresponding to the second target datum are determined, the M number of first subsequent transaction data and N number of second subsequent transaction data are used to update the second target datum to obtain the updated second data.

In the embodiments of the present disclosure, a plurality of first data to be compared within a preset duration are obtained from a first data center, and a plurality of second data to be compared within the preset duration are obtained from a second data center, and then the same data unique identifier among the plurality of first data to be compared and the plurality of second data to be compared is determined and used as a first data identifier. For any first data identifier, the first datum to be compared corresponding to the first data identifier is obtained from the plurality of first data to be compared as a first target datum, and a second datum to be compared corresponding to the first data identifier is obtained from the plurality of second data to be compared as a second target datum; and the second target datum is updated based on a first transaction status of the first target datum and a second transaction status of the second target datum. Since the judgment in the present disclosure is not simply based on the update time of the first target datum and the update time of the second target datum, but based on the first transaction status of the first target datum and the second transaction status of the second target datum to update the second target datum, the sequence relationship of each transaction status in the transaction scenario is fully considered, making the updated second target datum more accurate and ensuring the data integrity and continuity of the second data center.

Optionally, in the above step S203, the updating the second target datum based on the first transaction status of the first target datum and the second transaction status of the second target datum includes the following two possible implementations.

Figure 3:
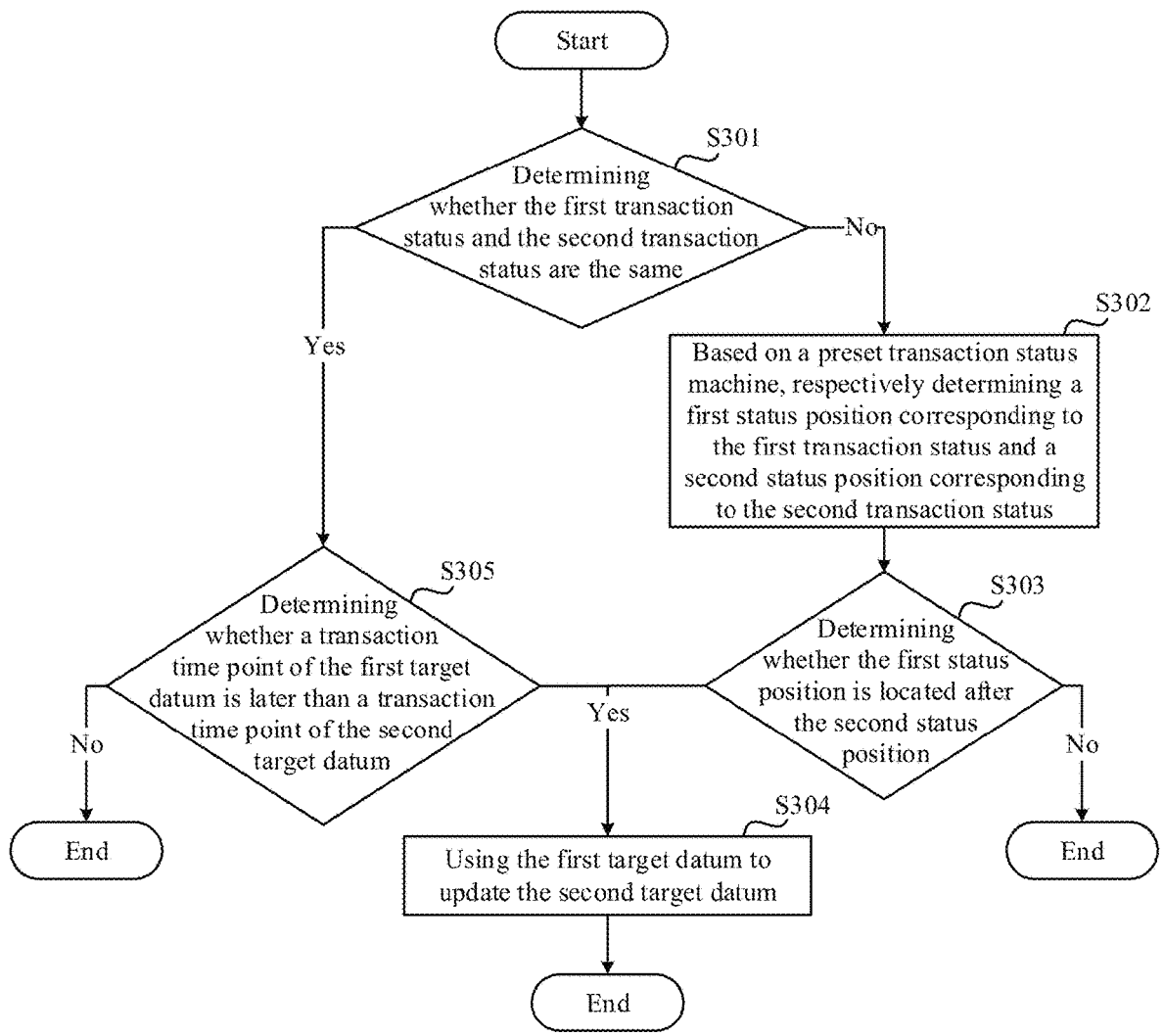
FIG. 3 is a schematic flow chart of a second target datum updating method provided by embodiments of the present disclosure.

In a first possible implementation, for the situation where the first transaction status in the first target datum is not empty, and the second transaction status in the second target datum is not empty, the process specifically includes the following steps as shown in FIG. 3.

Step S301: determining whether the first transaction status and the second transaction status are the same. If not, the process goes to step S302; otherwise, the process goes to step S305.

Step S302: based on a preset transaction status machine, respectively determining a first status position corresponding to the first transaction status and a second status position corresponding to the second transaction status.

Step S303: determining whether the first status position is located after the second status position. If so, the process goes to step S304; otherwise, the process ends.

Step S304: using the first target datum to update the second target datum and ending the process.

Step S305: determining whether a transaction time point of the first target datum is later than a transaction time point of the second target datum. If so, the process goes to step S304; otherwise, the process ends.

In the embodiments of the present disclosure, for the situation where the first transaction status in the first target datum is not empty, and the second transaction status in the second target datum is not empty, the first status position corresponding to the first transaction status and the second status position corresponding to the second transaction status are respectively determined based the preset transaction status machine, and the second target datum is updated based on the positional relationship between the first status position and the second status position, so that the updated second target datum is more accurate.

Figure 4:
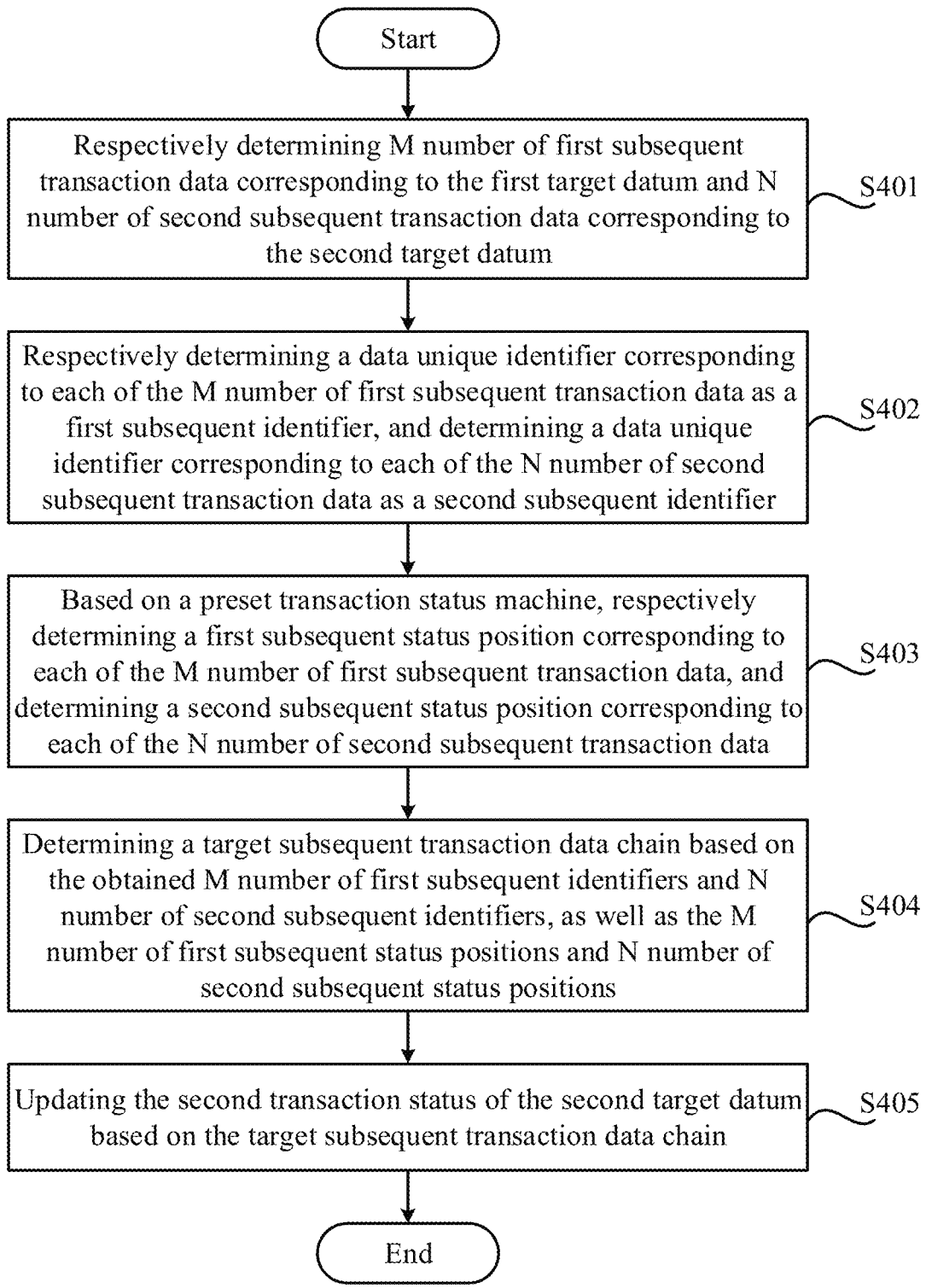
FIG. 4 is a schematic flow chart of a second target datum updating method provided by embodiments of the present disclosure.

In a second possible implementation, for the situation where the first transaction status in the first target datum is empty, and the second transaction status in the second target datum is empty, the process specifically includes the following steps as shown in FIG. 4.

Step S401: respectively determining M number of first subsequent transaction data corresponding to the first target datum and N number of second subsequent transaction data corresponding to the second target datum, where M>=0 and N>=0.

Specifically, since there is an application service unique identifier of the associated basic transaction data in the subsequent transaction datum, based on this, M number of subsequent transaction data associated with the first target datum can be determined from the plurality of subsequent transaction data as M number of first subsequent transaction data, and N number of subsequent transaction data associated with the second target datum can be determined from the plurality of subsequent transaction data as N number of second subsequent transaction data.

Step S402: respectively determining a data unique identifier corresponding to each of the M number of first subsequent transaction data as a first subsequent identifier, and determining a data unique identifier corresponding to each of the N number of second subsequent transaction data as a second subsequent identifier.

Step S403: based on a preset transaction status machine, respectively determining a first subsequent status position corresponding to each of the M number of first subsequent transaction data, and determining a second subsequent status position corresponding to each of the N number of second subsequent transaction data.

Specifically, different business scenarios have different preset transaction status machines, such as the consumption business status machine corresponding to the consumption business. The preset transaction status machine includes multiple transaction statuses and status transition paths among respective transaction statuses. The status transition paths among respective transaction statuses are related to the actual transaction sequence. The order of each transaction status can be determined based on the status transition path.

Figure 5:
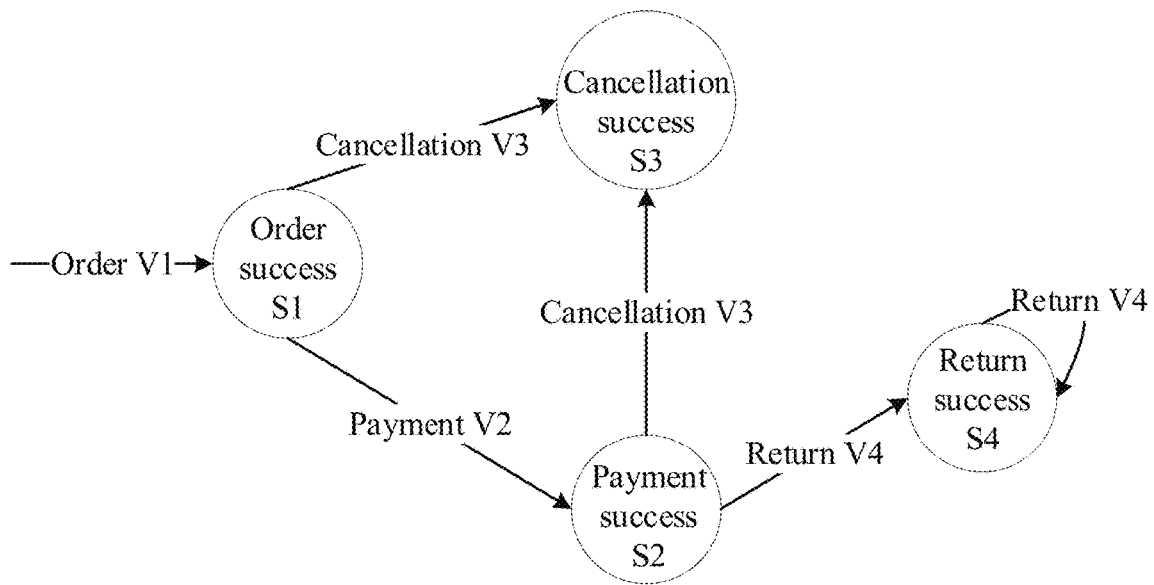
FIG. 5 is a schematic structural diagram of a consumption service status machine provided by embodiments of the present disclosure.

For example, the consumption business status machine is shown in FIG. 5. The consumption business status machine includes multiple transaction statuses, namely: order success S1, payment success S2, cancellation success S3 and return success S4. The consumption business status machine includes multiple status transition paths, namely: order V1, payment V2, cancellation V3, and return V4. Here, the status transition path between order success S1 and payment success S2 is payment V2, the status transition path between order success S1 and cancellation success S3 is cancellation V3, the status transition path between payment success S2 and cancellation success S3 is cancellation V3, and the status transition path between payment success S2 and return success S4 is return V4.

Step S404: determining a target subsequent transaction data chain based on the obtained M number of first subsequent identifiers and N number of second subsequent identifiers, as well as the M number of first subsequent status positions and N number of second subsequent status positions.

Specifically, the target subsequent transaction data chain consists of first subsequent transaction data and second subsequent transaction data.

It determines that the first target datum corresponds to two first subsequent transaction data, i.e., a first payment transaction data and a first return transaction data; and the second target datum corresponds to one second subsequent transaction data, i.e., a second payment transaction data.

The second payment transaction data and the first return transaction data are determined as target subsequent transaction data according to a first subsequent identifier and a first subsequent status position corresponding to each of the two first subsequent transaction data, and a second subsequent identifier and a second subsequent status position corresponding to the one second subsequent transaction data.

The transaction time point of the second payment transaction data is set to 10:00:00, and the transaction time point of the first return transaction data is set to 10:00:05. The above two target subsequent transaction data are sorted according to the transaction time point to obtain a target subsequent transaction data chain, where the target subsequent transaction data chain is the second payment transaction data-the first return transaction data.

Step S405: updating the second transaction status of the second target datum based on the target subsequent transaction data chain.

Figure 6:
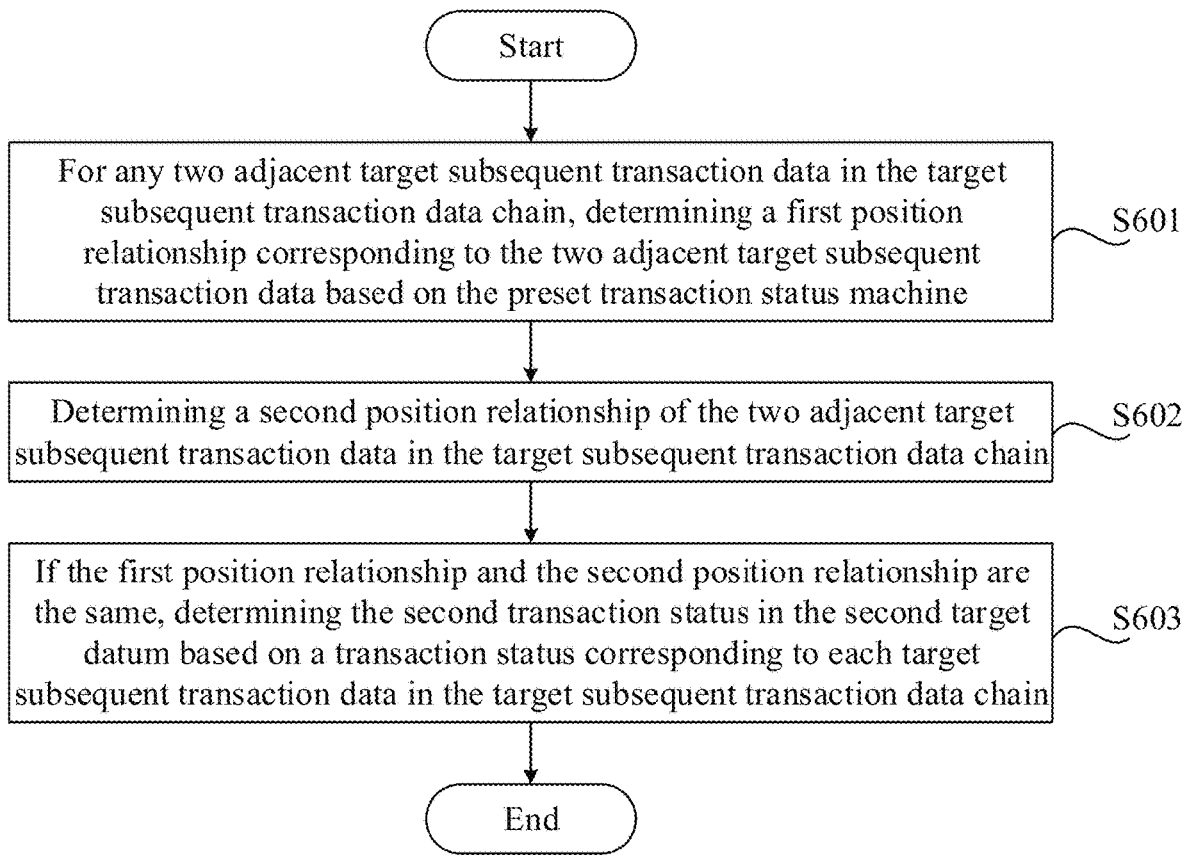
FIG. 6 is a schematic flow chart of a second transaction status updating method provided by embodiments of the present disclosure.

Specifically, updating the second transaction status of the second target datum includes the following execution steps as shown in FIG. 6.

Step S601: for any two adjacent target subsequent transaction data in the target subsequent transaction data chain, determining a first position relationship corresponding to the two adjacent target subsequent transaction data based on the preset transaction status machine.

Specifically, the corresponding transaction status of each of the two adjacent target subsequent transaction data is determined respectively; then based on the preset transaction status machine, the status position of the transaction status corresponding to each of the two adjacent target subsequent transaction data is determined; finally, the first position relationship is determined based on the status position corresponding to each of the two adjacent target subsequent transaction data.

Step S602: determining a second position relationship of the two adjacent target subsequent transaction data in the target subsequent transaction data chain.

Step S603, if the first position relationship and the second position relationship are the same, determining the second transaction status in the second target datum based on a transaction status corresponding to each target subsequent transaction data in the target subsequent transaction data chain. If the first position relationship and the second position relationship are different, the second target datum is manually reviewed.

Here, the attribute value corresponding to the attribute identifier in the second target datum can also be determined based on the attribute values corresponding to other attribute identifiers corresponding to each target subsequent transaction data in the target subsequent transaction data chain.

For example, the target subsequent transaction data chain is set to the second payment transaction data-the first return transaction data. Based on the preset transaction status machine, the transaction status corresponding to the second payment transaction data is determined to be payment success S2, and the transaction status corresponding to the first return transaction data is return success S4. Therefore, the first position relationship corresponding to the second payment transaction data and the first return transaction data is: the second payment transaction data is before the first return transaction data.

The second position relationship between the second payment transaction data and the first return transaction data in the target subsequent transaction data chain is determined to be: the second payment transaction data is before the first return transaction data.

Since the first position relationship and the second position relationship are the same, the second transaction status in the second target datum is determined based on the corresponding transaction statuses of the second payment transaction data and the first return transaction data.

In the embodiments of the present disclosure, for the situation where the first transaction status in the first target datum is empty, and the second transaction status in the second target datum is empty, based on the M number of first subsequent transaction data corresponding to the first target datum and N number of second subsequent transaction data corresponding to the second target datum, the target subsequent transaction data chain is determined, and the second transaction status in the second target datum is updated based on the target subsequent transaction data chain. Since the present disclosure is based on the target subsequent transaction data chain, the second transaction status in the second target datum is updated, making the updated second target datum more accurate.

Optionally, in the above step S404, determining the target subsequent transaction data chain includes the following two possible implementations.

In a first possible implementation, for the situation where the same subsequent identifiers do not exist among the M number of first subsequent identifiers and the N number of second subsequent identifiers, the process specifically includes the following execution steps:

determining a first subsequent transaction datum corresponding to each of the M number of first subsequent status positions and a second subsequent transaction datum corresponding to each of the N number of second subsequent status positions as target subsequent transaction data; then sorting the target subsequent transaction datum according to transaction time points to obtain the target subsequent transaction data chain.

In the embodiments of the present disclosure, in the case where the same subsequent identifier does not exist among the M number of first subsequent identifiers and the N number of second subsequent identifiers, the target subsequent transaction data chain is determined directly based on the M number of first subsequent transaction data and the N number of second subsequent transaction data, which improves the efficiency of generating target subsequent transaction data.

Figure 7:
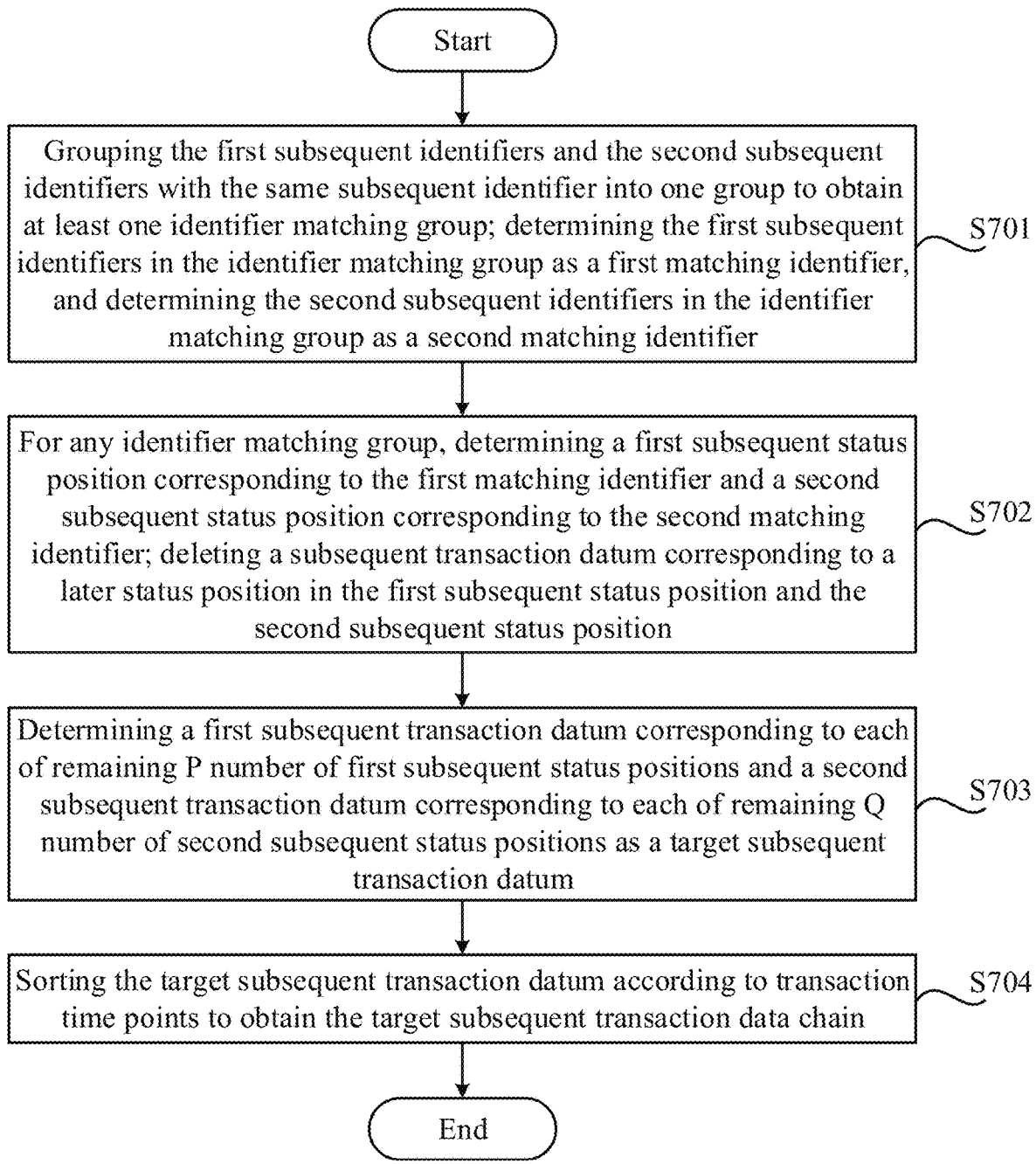
FIG. 7 is a schematic flow chart of a method for determining a target subsequent transaction data chain provided by embodiments of the present disclosure.

In a second possible implementation, for the situation where the same subsequent identifier exists among the M number of first subsequent identifiers and the N number of second subsequent identifiers, the process specifically includes the following steps as shown in FIG. 7.

Step S701: grouping the first subsequent identifiers and the second subsequent identifiers with the same subsequent identifier into one group to obtain at least one identifier matching group; determining the first subsequent identifiers in the identifier matching group as a first matching identifier, and determining the second subsequent identifiers in the identifier matching group as a second matching identifier.

Step S702: for any identifier matching group, determining a first subsequent status position corresponding to the first matching identifier and a second subsequent status position corresponding to the second matching identifier; deleting a subsequent transaction datum corresponding to a later status position in the first subsequent status position and the second subsequent status position.

Step S703: determining a first subsequent transaction datum corresponding to each of remaining P number of first subsequent status positions and a second subsequent transaction datum corresponding to each of remaining Q number of second subsequent status positions as a target subsequent transaction datum.

Step S704: sorting the target subsequent transaction datum according to transaction time points to obtain the target subsequent transaction data chain.

In the embodiments of the present disclosure, for the situation where the same subsequent identifier exists among the M number of first subsequent identifiers and the N number of second subsequent identifiers, the subsequent transaction datum corresponding to the later status position of the first subsequent status position and the second subsequent status position is deleted, which ensures the accuracy of the remaining subsequent transaction data, thereby ensuring the accuracy of the generated target subsequent transaction data chain.

Optionally, the present disclosure further provides two other data fusion methods as following.

Figure 8:
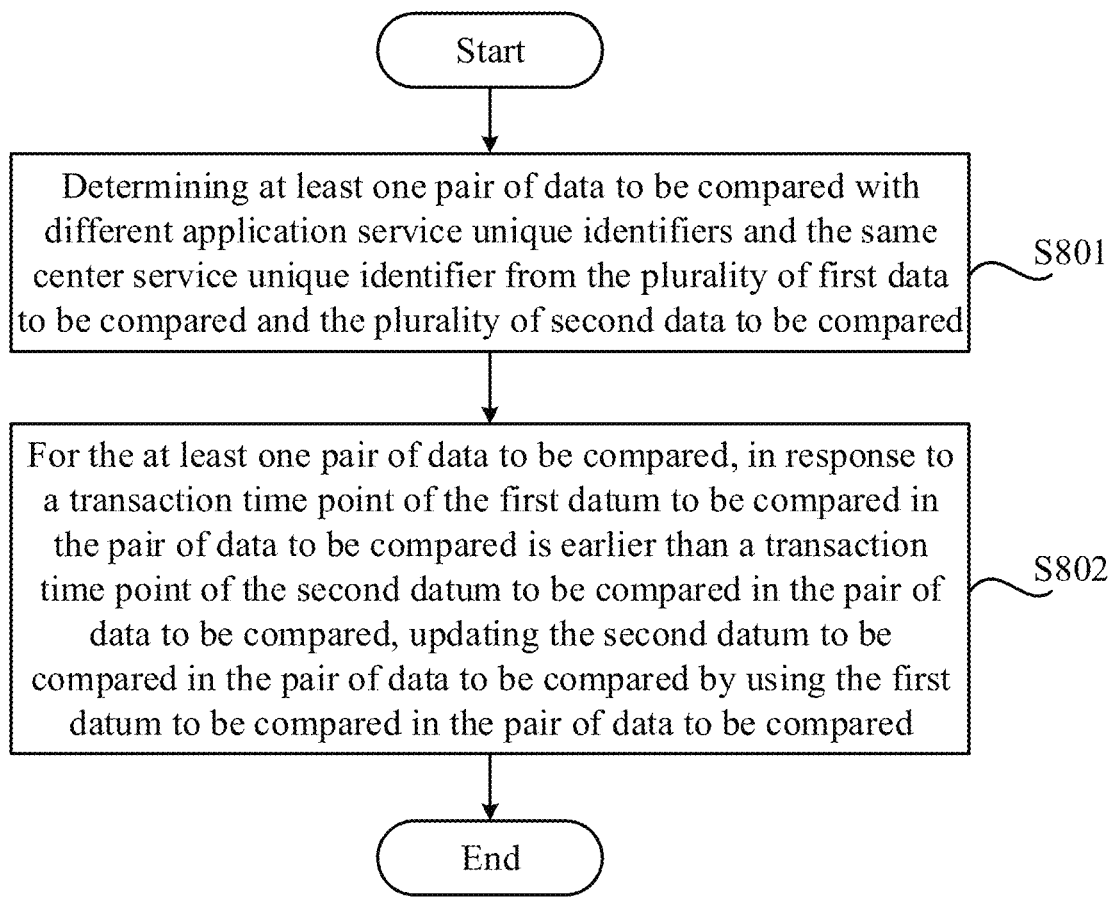
FIG. 8 is a schematic flow chart of another data fusion method provided by embodiments of the present disclosure.

In a first one of the other data fusion methods, for the situation where the data unique identifier part in the first datum to be compared and the second datum to be compared is the same, the process specifically includes the following steps as shown in FIG. 8.

Step S801: determining at least one pair of data to be compared with different application service unique identifiers and the same center service unique identifier from the plurality of first data to be compared and the plurality of second data to be compared.

The pair of data to be compared includes a first datum to be compared and a second datum to be compared.

Step S802: for the at least one pair of data to be compared, in response to a transaction time point of the first datum to be compared in the pair of data to be compared is earlier than a transaction time point of the second datum to be compared in the pair of data to be compared, updating the second datum to be compared in the pair of data to be compared by using the first datum to be compared in the pair of data to be compared.

In the embodiments of the present disclosure, for the pair of data to be compared with different application service unique identifiers and the same center service unique identifier, the above update method ensures the accuracy of the second datum to be compared in the pair of data to be compared.

In a second one of the other data fusion methods, for the situation where the data unique identifier is only in the plurality of first data to be compared, the process specifically includes the following steps:

determining the data unique identifier only in the plurality of first data to be compared as a second data identifier;
obtaining the first datum to be compared corresponding to the second data identifier from the plurality of first data to be compared, and adding the first datum to be compared corresponding to the second data identifier to the second data center.

In the embodiments of the present disclosure, the first datum to be compared corresponding to the second data identifier that only exists in the first data center is added to the second data center to ensure the data integrity of the second data center.

Optionally, in the above step S203, after updating the second target datum based on the first transaction status of the first target datum and the second transaction status of the second target datum, the following two possible verification implementations are also included.

In a first possible verification implementation, for a first attribute identifier in the second target datum, whether a first attribute value corresponding to the first attribute identifier is within a preset range is determined; if not, the second target datum is added to an exception file.

For example, the first attribute identifier is payment amount, and a value of the payment amount should be greater than or equal to 0.

In the embodiments of the present disclosure, the second target datum is verified for the relationship between the first attribute value corresponding to the first attribute identifier and the preset range, thereby ensuring the accuracy of the second target datum.

In a second possible verification implementation, for the first attribute identifier in the second target datum, a second attribute identifier associated with the first attribute identifier is determined, and whether the first attribute value corresponding to the first attribute identifier and a second attribute value corresponding to the second attribute identifier satisfy a preset relationship is determined, if so, the second target datum is added to the exception file.

Here, the exception file is used for manual review.

For example, the first attribute identifier is payment amount, and the second attribute identifier is transaction amount. The preset relationship between the payment amount and the transaction amount is: a value of the payment amount is less than or equal to a value of the transaction amount.

In the embodiments of the present disclosure, the second target datum is verified based on the relationship between the first attribute value corresponding to the first attribute identifier and the second attribute value corresponding to the second attribute identifier, ensuring the accuracy of the second target datum.

Figure 9:
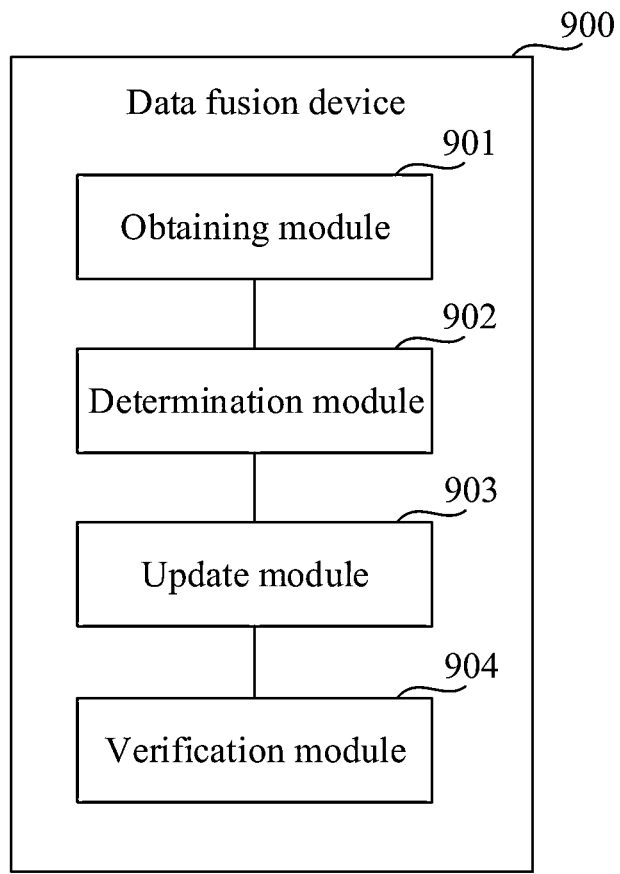
FIG. 9 is a schematic structural diagram of a data fusion device provided by embodiments of the present disclosure.

Based on the same technical concept, embodiments of the present disclosure provide a data fusion device. As shown in FIG. 9, the data fusion device 900 includes:

an obtaining module 901, configured to obtain a plurality of first data to be compared within a preset duration from a first data center, and to obtain a plurality of second data to be compared within the preset duration from a second data center; wherein the preset duration is determined based on a switching time point of a data center;

a determination module 902, configured to determine a same data unique identifier among the plurality of first data to be compared and the plurality of second data to be compared, as a first data identifier;

an update module 903, configured to obtain, for any first data identifier, a first datum to be compared corresponding to the first data identifier from the plurality of first data to be compared as a first target datum, and obtain a second datum to be compared corresponding to the first data identifier from the plurality of second data to be compared as a second target datum; and update the second target datum based on a first transaction status of the first target datum and a second transaction status of the second target datum.

Optionally, the update module 903 is further configured for:

in response to the first transaction status of the first target datum being not empty, the second transaction status of the second target datum being not empty, and the first transaction status being different from the second transaction status, respectively determining a first status position corresponding to the first transaction status and a second status position corresponding to the second transaction status based on a preset transaction status machine;

in response to the first status position being located after the second status position, updating the second target datum by using the first target datum.

Optionally, the update module 903 is further configured for:

in response to the first transaction status being the same as the second transaction status, judging a transaction time point of the first target datum and a transaction time point of the second target datum;

in response to the transaction time point of the first target datum being later than the transaction time point of the second target datum, updating the second target datum by using the first target datum.

Optionally, the update module 903 is further configured for:

in response to the first transaction status of the first target datum being empty and the second transaction status of the second target datum being empty, respectively determining M number of first subsequent transaction data corresponding to the first target datum and N number of second subsequent transaction data corresponding to the second target datum; wherein M>=0, N>=0;

respectively determining a data unique identifier corresponding to each of the M number of first subsequent transaction data as a first subsequent identifier, and determining a data unique identifier corresponding to each of the N number of second subsequent transaction data as a second subsequent identifier;

based on a preset transaction status machine, respectively determining a first subsequent status position corresponding to each of the M number of first subsequent transaction data and determining a second subsequent status position corresponding to each of the N number of second subsequent transaction data;

based on the obtained M number of first subsequent identifiers and N number of second subsequent identifiers, as well as the M number of first subsequent status positions and N number of second subsequent status positions, determining a target subsequent transaction data chain;

updating the second transaction status of the second target datum based on the target subsequent transaction data chain.

Optionally, the update module 903 is further configured for:

in response to a same subsequent identifier not existing among the M number of first subsequent identifiers and the N number of second subsequent identifiers, determining a first subsequent transaction datum corresponding to each of the M number of first subsequent status positions, and a second subsequent transaction datum corresponding to each of the N number of second subsequent status positions as a target subsequent transaction datum;

sorting the target subsequent transaction datum according to transaction time points to obtain the target subsequent transaction data chain.

Optionally, the update module 903 is further configured for:

in response to the same subsequent identifier existing among the M number of first subsequent identifiers and the N number of second subsequent identifiers, grouping the first subsequent identifiers and the second subsequent identifiers with the same subsequent identifier into one group to obtain at least one identifier matching group; determining the first subsequent identifiers in the identifier matching group as a first matching identifier, and determining the second subsequent identifiers in the identifier matching group as a second matching identifier;

for any identifier matching group, determining a first subsequent status position corresponding to the first matching identifier and a second subsequent status position corresponding to the second matching identifier; deleting a subsequent transaction datum corresponding to a later status position in the first subsequent status position and the second subsequent status position;

determining a first subsequent transaction datum corresponding to each of remaining P number of first subsequent status positions and a second subsequent transaction datum corresponding to each of remaining Q number of second subsequent status positions as a target subsequent transaction datum; wherein 0<=P<=M, 0<=Q<=N;

sorting the target subsequent transaction datum according to transaction time points to obtain the target subsequent transaction data chain.

Optionally, the update module 903 is further configured for:

for any two adjacent target subsequent transaction data in the target subsequent transaction data chain, determining a first position relationship corresponding to the two adjacent target subsequent transaction data based on the preset transaction status machine;

determining a second position relationship of the two adjacent target subsequent transaction data in the target subsequent transaction data chain;

in response to the first position relationship being the same as the second position relationship, determining the second transaction status of the second target datum based on a transaction status corresponding to each target subsequent transaction data in the target subsequent transaction data chain.

Optionally, the data unique identifier includes an application service unique identifier and a center service unique identifier; and the update module 903 is further configured for:

determining at least one pair of data to be compared with different application service unique identifiers and the same center service unique identifier from the plurality of first data to be compared and the plurality of second data to be compared; wherein the pair of data to be compared includes a first datum to be compared and a second datum to be compared;

for the at least one pair of data to be compared, in response to a transaction time point of the first datum to be compared in the pair of data to be compared is earlier than a transaction time point of the second datum to be compared in the pair of data to be compared, updating the second datum to be compared in the pair of data to be compared by using the first datum to be compared in the pair of data to be compared.

Optionally, the device further includes a verification module 904 configured for:

for a first attribute identifier in the second target datum, determining whether a first attribute value corresponding to the first attribute identifier is within a preset range, and in response to the first attribute value corresponding to the first attribute identifier being not within the preset range, adding the second target datum to an exception file;

for the first attribute identifier in the second target datum, determining a second attribute identifier associated with the first attribute identifier, and determining whether the first attribute value corresponding to the first attribute identifier and a second attribute value corresponding to the second attribute identifier satisfy a preset relationship, in response to the preset relationship being satisfied, adding the second target datum the exception file; wherein the exception file is used for manual review.

Figure 10:
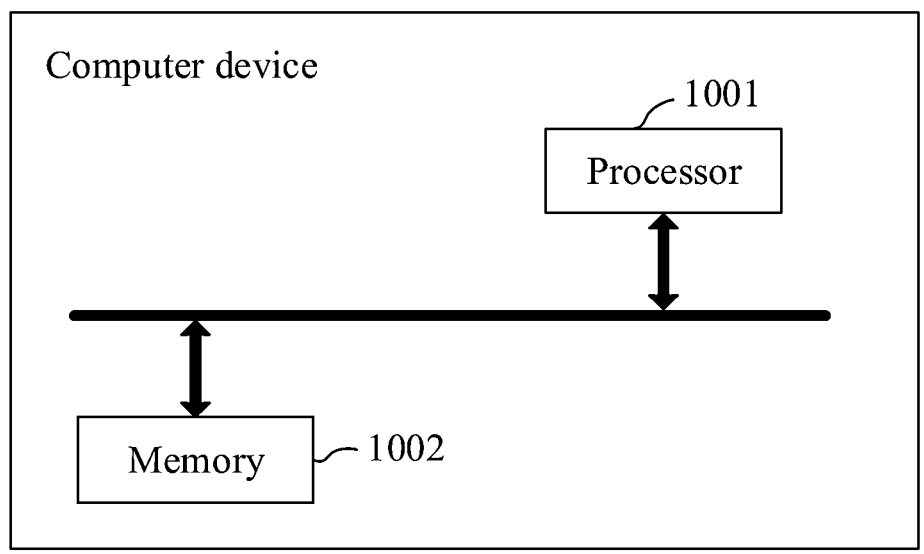
FIG. 10 is a schematic structural diagram of a computer device provided by embodiments of the present disclosure.

Based on the same technical concept, embodiments of the present disclosure provide a computer device. The computer device can be a terminal or a server. As shown in FIG. 10, the computer includes at least one processor 1001 and a memory 1002 connected to the at least one processor. The embodiments of the present disclosure do not limit the specific connection medium between the processor 1001 and the memory 1002. The connection between the processor 1001 and the memory 1002 in FIG. 10 via a bus is taken as an example. The bus can be divided into address bus, data bus, control bus, etc.

In the embodiments of the present disclosure, the memory 1002 stores instructions that can be executed by at least one processor 1001. By executing the instructions stored in the memory 1002, at least one processor 1001 can perform the steps included in the above data fusion method.

Here, the processor 1001 is the control center of the computer device. The processor 1001 can use various interfaces and lines to connect various parts of the computer device, and perform data fusion by running or executing instructions stored in the memory 1002 and calling data stored in the memory 1002. Optionally, the processor 1001 can include one or more processing units. The processor 1001 can integrate an application processor and a modem processor. The application processor mainly processes the operating system, user interface, application programs, etc., and the modem processor mainly processes wireless communications. It can be understood that the above modem processor can not be integrated into the processor 1001. In some embodiments, the processor 1001 and the memory 1002 can be implemented on the same chip, and in some embodiments, the processor 1001 and the memory 1002 can also be implemented on separate chips.

The processor 1001 can be a general processor, such as a central processing unit (CPU), a digital signal processor, an application specific integrated circuit (ASIC), a field programmable gate array or other programmable logic devices, discrete gates or transistors Logic devices and discrete hardware components, which can implement or execute the methods, steps and logical block diagrams disclosed in the embodiments of the present disclosure. A general-purpose processor can be a microprocessor or any conventional processor, etc. The steps of the methods disclosed in conjunction with the embodiments of the present disclosure can be directly implemented by a hardware processor for execution, or can be executed by a combination of hardware and software modules in the processor.

As a non-volatile computer-readable storage medium, the memory 1002 can be used to store non-volatile software programs, non-volatile computer executable programs and modules. The memory 1002 may include at least one type of storage medium, for example, may include flash memory, hard disk, multimedia card, card-type memory, random access memory (RAM), static random access memory (SRAM), programmable read only memory (PROM), read only memory (ROM), electrically erasable programmable read-only memory (EEPROM), magnetic memory, magnetic disk, CD, etc. the memory 1002 is, but is not limited to, any other medium that can be used to carry or store desired program codes in the form of instructions or data structures and that can be accessed by a computer. The memory 1002 in the embodiments of the present disclosure can also be a circuit or any other device capable of realizing a storage function, used to store program instructions and/or data.

Based on the same inventive concept, embodiments of the present disclosure provide a computer-readable storage medium that stores a computer program executed by a computer device, wherein the program is run on the computer device to cause the computer device to execute the steps of the above data fusion method.

Based on the same inventive concept, embodiments of the present disclosure provide a computer program product. The computer program product includes a computer program stored in a computer-readable storage medium. The computer program includes program instructions. The program instructions are executed by a computer to cause the computer to perform the steps of the above data fusion method.

Those skilled in the art will understand that embodiments of the present disclosure may be provided as methods, systems, or computer program products. Accordingly, the present disclosure may take the form of an entirely hardware embodiment, an entirely software embodiment, or an embodiment that combines software and hardware aspects. Furthermore, the present disclosure may take the form of a computer program product embodied on one or more computer-usable storage media (including, but not limited to, disk storage, CD-ROM, optical storage, etc.) having computer-usable program codes embodied therein.

The present disclosure is described with reference to flowchart illustrations and/or block diagrams of methods, apparatus (systems), and computer program products according to the present disclosure. It will be understood that each process and/or block in the flowchart illustrations and/or block diagrams, and combinations of processes and/or blocks in the flowchart illustrations and/or block diagrams, can be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device produce a device for realizing the functions specified in one process or multiple processes of the flowchart and/or one block or multiple blocks of the block diagram.

These computer program instructions can also be stored in computer-readable memory that can guide a computer or other programmable data processing device to operate in a specific manner, causing the instructions stored in the computer-readable memory to produce a manufactured product including instruction devices that implement the functions specified in a flowchart or multiple flowcharts and/or a block diagram or multiple boxes.

These computer program instructions may also be loaded onto a computer or other programmable data processing device, causing a series of operating steps to be performed on the computer or other programmable device to produce computer-implemented processing, thereby executing on the computer or other programmable device. Instructions provide steps for implementing the functions specified in a process or processes of a flowchart diagram and/or a block or blocks of a block diagram.

Obviously, those skilled in the art can make various changes and modifications to the present disclosure without departing from the spirit and scope of the present disclosure. In this way, if these modifications and variations of the present disclosure fall within the scope of the claims of this application and its equivalent technology, then this application is also intended to include these modifications and variations.

What is claimed is:

1. A data fusion method, comprising:
   obtaining a plurality of first data to be compared within a preset duration from a first data center, and obtaining a plurality of second data to be compared within the preset duration from a second data center; wherein the preset duration is determined based on a switching time point of a data center;

determining data unique identifiers that are the same among the plurality of first data to be compared and the plurality of second data to be compared, as a first data identifier;

for any first data identifier, obtaining a first datum to be compared corresponding to the first data identifier from the plurality of first data to be compared as a first target datum, and obtaining a second datum to be compared corresponding to the first data identifier from the plurality of second data to be compared as a second target datum; and updating the second target datum based on a first transaction status of the first target datum and a second transaction status of the second target datum.

2. The data fusion method according to claim 1, wherein the updating the second target datum based on the first transaction status of the first target datum and the second transaction status of the second target datum, comprises:

in response to the first transaction status of the first target datum being not empty, the second transaction status of the second target datum being not empty, and the first transaction status being different from the second transaction status, determining a first status position corresponding to the first transaction status and a second status position corresponding to the second transaction status based on a preset transaction status machine;

in response to the first status position being located after the second status position, updating the second target datum by using the first target datum.

3. The data fusion method according to claim 2, further comprising:

in response to the first transaction status being the same as the second transaction status, judging a transaction time point of the first target datum and a transaction time point of the second target datum; and in response to the transaction time point of the first target datum being later than the transaction time point of the second target datum, updating the second target datum by using the first target datum.

4. The data fusion method according to claim 1, wherein the updating the second target datum based on the first transaction status of the first target datum and the second transaction status of the second target datum, comprises:

in response to the first transaction status of the first target datum being empty and the second transaction status of the second target datum being empty, determining M number of first subsequent transaction data corresponding to the first target datum and N number of second subsequent transaction data corresponding to the second target datum; wherein $M>=0$, $N>=0$;

respectively determining data unique identifiers respectively corresponding to the M number of first subsequent transaction data as first subsequent identifiers, and determining data unique identifiers respectively corresponding to the N number of second subsequent transaction data as second subsequent identifiers;

based on a preset transaction status machine, determining first subsequent status positions respectively corresponding to the M number of first subsequent transaction data and determining second subsequent status positions respectively corresponding to the N number of second subsequent transaction data;

based on the obtained M number of first subsequent identifiers and N number of second subsequent identifiers, as well as the obtained M number of first subsequent status positions and N number of second subsequent status positions, determining a target subsequent transaction data chain; and updating the second transaction status of the second target datum based on the target subsequent transaction data chain.

5. The data fusion method according to claim 4, wherein the based on the obtained M number of first subsequent identifiers and N number of second subsequent identifiers, as well as the obtained M number of first subsequent status positions and N number of second subsequent status positions, determining the target subsequent transaction data chain, comprises:

in response to no subsequent identifiers that are the same existing among the M number of first subsequent identifiers and the N number of second subsequent identifiers, determining first subsequent transaction data respectively corresponding to the M number of first subsequent status positions, and second subsequent transaction data respectively corresponding to the N number of second subsequent status positions as a target subsequent transaction datum; and sorting the target subsequent transaction datum according to transaction time points to obtain the target subsequent transaction data chain.

6. The data fusion method according to claim 5, further comprising:

in response to subsequent identifiers that are the same existing among the M number of first subsequent identifiers and the N number of second subsequent identifiers, grouping the first subsequent identifiers and the second subsequent identifiers to obtain at least one identifier matching group, wherein first subsequent identifiers in the first subsequent identifiers and second subsequent identifiers in the second subsequent identifiers that are the same are grouped into one group; determining first subsequent identifiers in the identifier matching group as a first matching identifier, and determining the second subsequent identifiers in the identifier matching group as a second matching identifier;

for any identifier matching group, determining a first subsequent status position corresponding to the first matching identifier and a second subsequent status position corresponding to the second matching identifier; deleting a subsequent transaction datum corresponding to a later status position in the first subsequent status position and the second subsequent status position;

determining first subsequent transaction data corresponding to remaining P number of first subsequent status positions and second subsequent transaction data corresponding to remaining Q number of second subsequent status positions as target subsequent transaction data; wherein $0<=P<=M$, $0<=Q<=N$; and sorting the target subsequent transaction data according to transaction time points to obtain the target subsequent transaction data chain.

7. The data fusion method according to claim 4, wherein the updating the second transaction status of the second target datum based on the target subsequent transaction data chain, comprises:

for any two adjacent target subsequent transaction data in the target subsequent transaction data chain, determining a first position relationship corresponding to the two adjacent target subsequent transaction data based on the preset transaction status machine;

determining a second position relationship of the two adjacent target subsequent transaction data in the target subsequent transaction data chain; and in response to the first position relationship being the same as the second position relationship, determining the second transaction status of the second target datum based on transaction statuses corresponding to target subsequent transaction data in the target subsequent transaction data chain.

8. The data fusion method according to claim 1, wherein the data unique identifier comprises an application service unique identifier and a center service unique identifier; and the method further comprises:

determining at least one pair of data to be compared with different application service unique identifiers and the same center service unique identifiers from the plurality of first data to be compared and the plurality of second data to be compared; wherein the pair of data to be compared comprises a first datum to be compared and a second datum to be compared; and for the at least one pair of data to be compared, in response to a transaction time point of the first datum to be compared in the pair of data to be compared is earlier than a transaction time point of the second datum to be compared in the pair of data to be compared, updating the second datum to be compared in the pair of data to be compared by using the first datum to be compared in the pair of data to be compared.

9. The data fusion method according to claim 1, wherein after the updating the second target datum based on the first transaction status of the first target datum and the second transaction status of the second target datum, the method further comprises:

for a first attribute identifier in the second target datum, determining whether a first attribute value corresponding to the first attribute identifier is within a preset range, and in response to the first attribute value corresponding to the first attribute identifier being not within the preset range, adding the second target datum to an exception file; and for the first attribute identifier in the second target datum, determining a second attribute identifier associated with the first attribute identifier, and determining whether the first attribute value corresponding to the first attribute identifier and a second attribute value corresponding to the second attribute identifier satisfy a preset relationship, in response to the preset relationship being satisfied, adding the second target datum the exception file; wherein the exception file is used for manual review.

10. A computer device, comprising a memory, a processor and a computer program stored in the memory and executable on the processor, wherein the processor executes the computer program to implement steps of the data fusion method according to claim 1.

11. A computer-readable storage medium, storing a computer program executed by a computer device, wherein the computer program is run on the computer device to cause the computer device to execute steps of the data fusion method according to claim 1.

12. A computer program product, comprising a computer program stored in a computer-readable storage medium, and the computer program comprising program instructions, wherein the program instructions are executed by a computer device to cause the computer device to perform steps of the data fusion method according to claim 1.

13. A data fusion device, comprising:

an obtaining module, configured to obtain a plurality of first data to be compared within a preset duration from a first data center, and to obtain a plurality of second data to be compared within the preset duration from a second data center; wherein the preset duration is determined based on a switching time point of a data center;

a determination module, configured to determine data unique identifiers that are the same among the plurality of first data to be compared and the plurality of second data to be compared, as a first data identifier; and an update module, configured to obtain, for any first data identifier, a first datum to be compared corresponding to the first data identifier from the plurality of first data to be compared as a first target datum, and obtain a second datum to be compared corresponding to the first data identifier from the plurality of second data to be compared as a second target datum; and update the second target datum based on a first transaction status of the first target datum and a second transaction status of the second target datum.

* * * * *